United States Patent [19]

Knapp et al.

[11] 4,271,794
[45] Jun. 9, 1981

[54] FUEL DELIVERY APPARATUS

[75] Inventors: Heinrich Knapp, Leonberg; Hermann Eisele; Werner Kammerer, both of Vaihingen, all of Fed. Rep. of Germany

[73] Assignee: Robert Bosch GmbH, Stuttgart, Fed. Rep. of Germany

[21] Appl. No.: 930,089

[22] Filed: Aug. 1, 1978

[30] Foreign Application Priority Data

Sep. 6, 1977 [DE] Fed. Rep. of Germany ....... 2740001

[51] Int. Cl.³ ............................................. F02M 39/00
[52] U.S. Cl. ................................ 123/454; 261/50 A; 261/44 A
[58] Field of Search ................ 123/139 AW, 139 BG; 261/50 A, 50 AA, 44 R, 44 A

[56] References Cited

U.S. PATENT DOCUMENTS

| 4,108,117 | 8/1978 | Stumpp et al. | 261/44 R |
| 4,154,203 | 5/1979 | Peters et al. | 123/139 BG |
| 4,184,466 | 1/1980 | Nagele | 123/139 BG |

FOREIGN PATENT DOCUMENTS

2652347  5/1978  Fed. Rep. of Germany ... 123/139 BG

*Primary Examiner*—Ronald H. Lazarus
*Assistant Examiner*—Magdalen Moy
*Attorney, Agent, or Firm*—Edwin E. Greigg

[57] ABSTRACT

A fuel delivery apparatus is proposed for mixture-compressing, externally ignited internal combustion engines, which serves to meter a fuel quantity adapted to the quantity of air induced and to regulate the fuel-air mixture in accordance with operational characteristics of the internal combustion engine. The fuel delivery apparatus comprises a fuel metering system actuated by an air measuring element arranged in the air induction line of the internal combustion engine, while the air measuring element has a control body which controls the size of the air induction tube cross-sectional area, a radial vane which is pivotably fixed in a work chamber, and a damping vane fixed in a damping chamber. The radial vane separates the work chamber into partial chambers and is impacted upon by the pressure upstream and downstream of the control body in such a manner that a force engages the radial vane which is capable of moving the control body in the direction of an enlargement of the controlled induction tube cross-sectional area and which acts counter to a return force. The damping vane separates the damping chamber into a pressure chamber and a throttle chamber; the pressure chamber is connected with atmospheric pressure or with the pressure upstream of the control body, and the throttle chamber, into which the damping vane moves during an opening movement of the control body, is connected with the pressure chamber via a throttle point. The throttle chamber and/or the pressure chamber of the damping chamber are capable of being connected with the induction tube section downstream of the control body by means of contro valves in accordance with operational characteristics of the internal combustion engine, for the purpose of influencing the fuel-air mixture furnished to the internal combustion engine.

14 Claims, 11 Drawing Figures

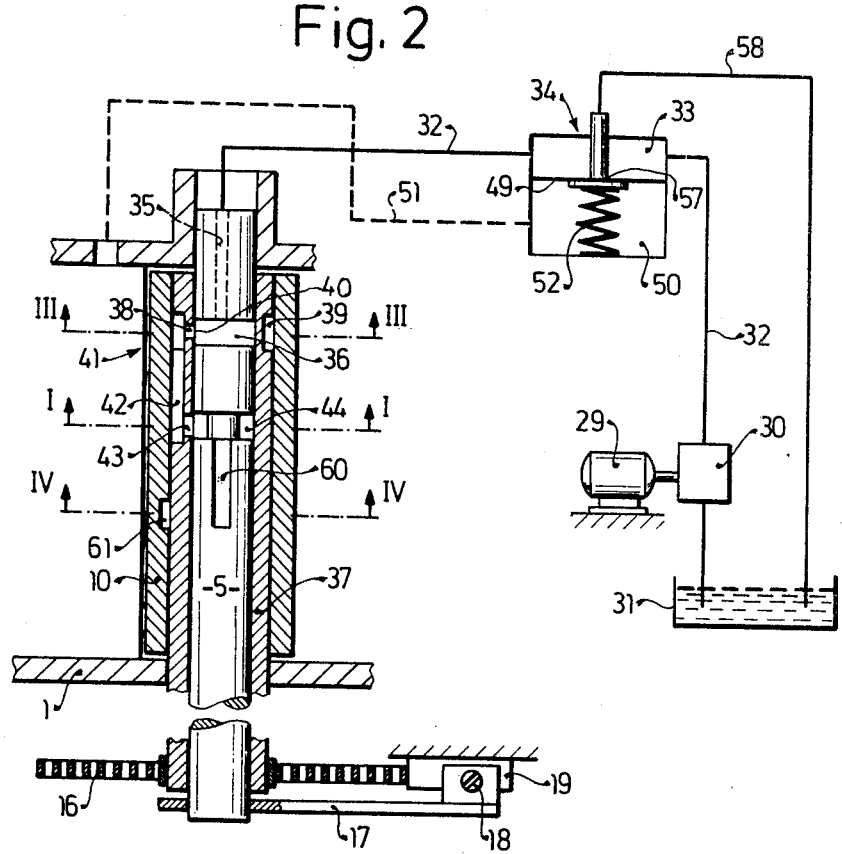
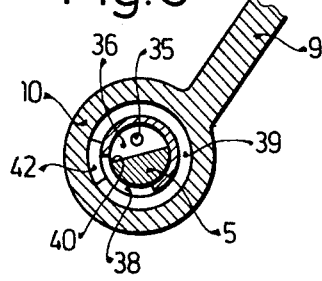
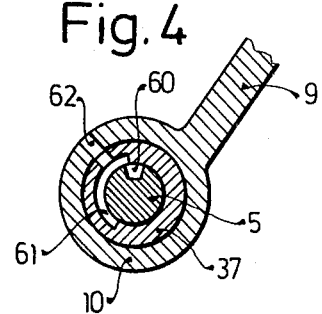

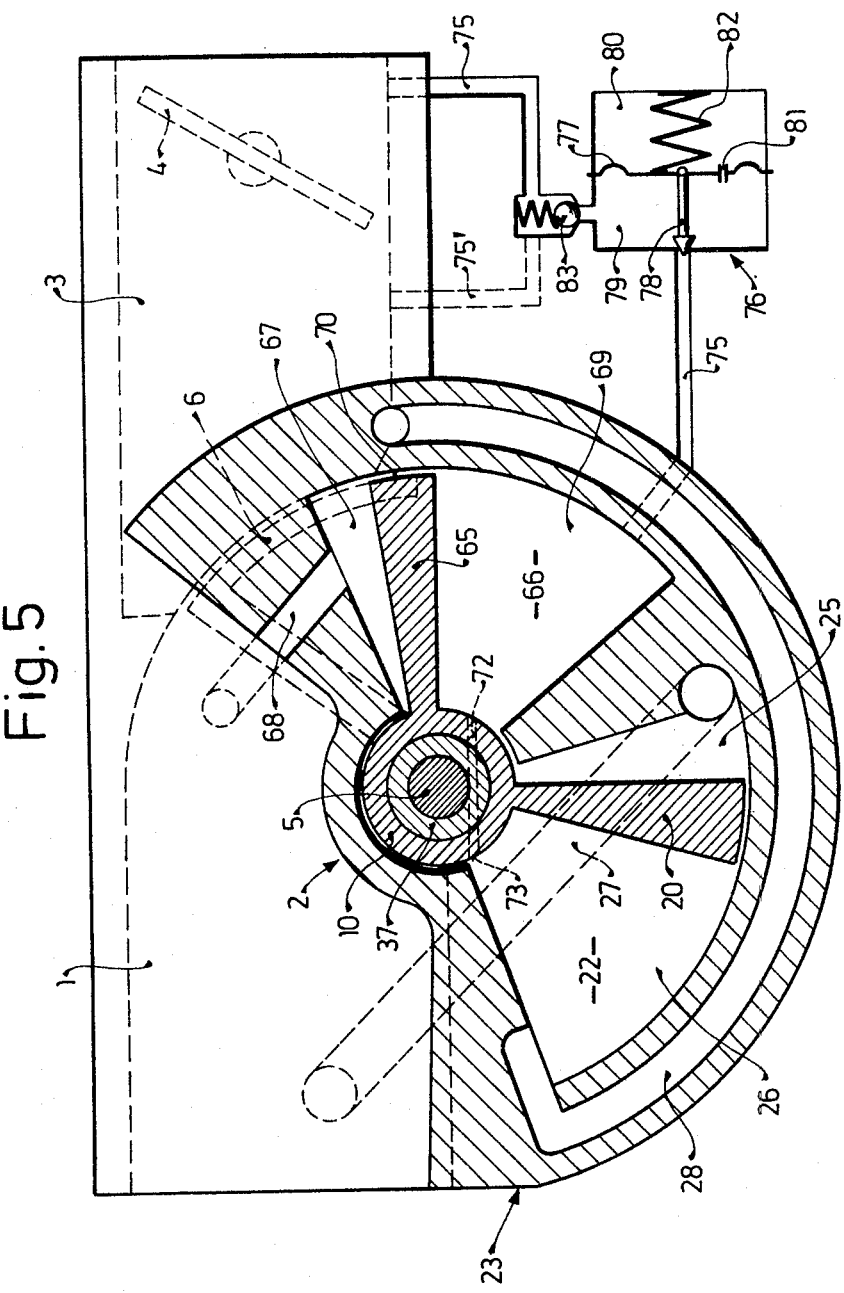

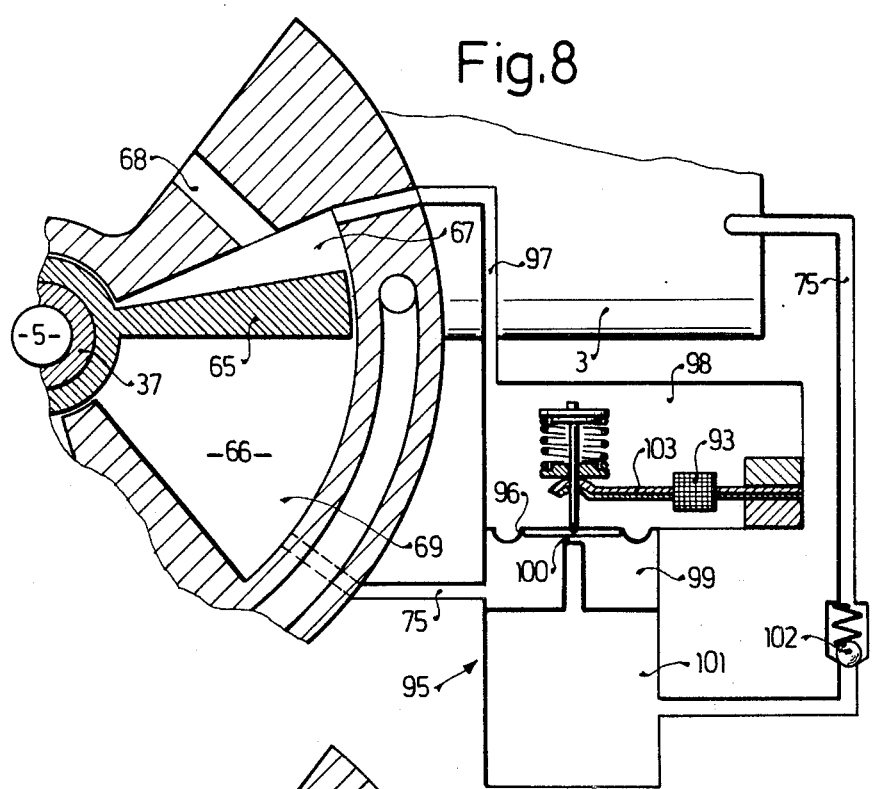
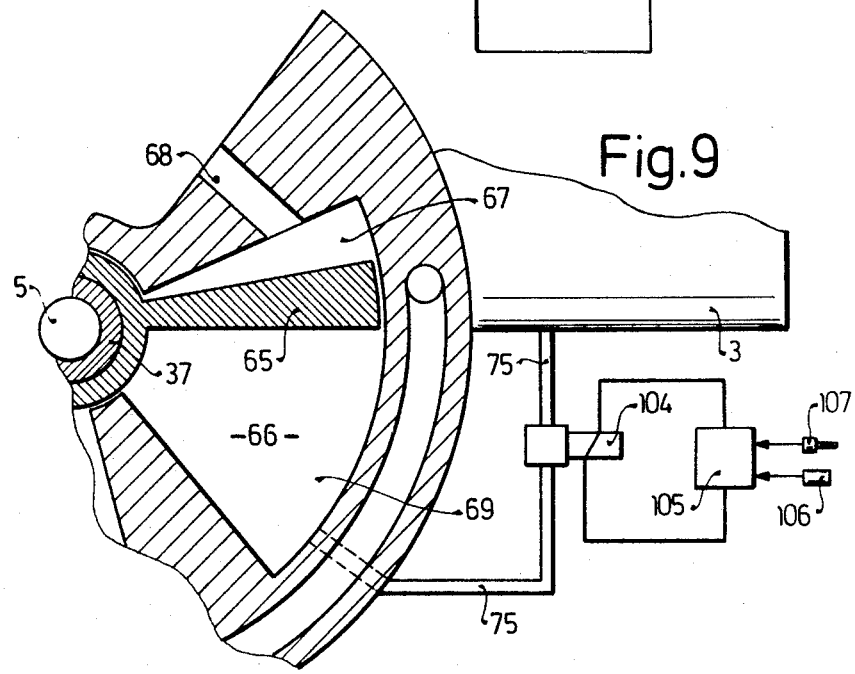

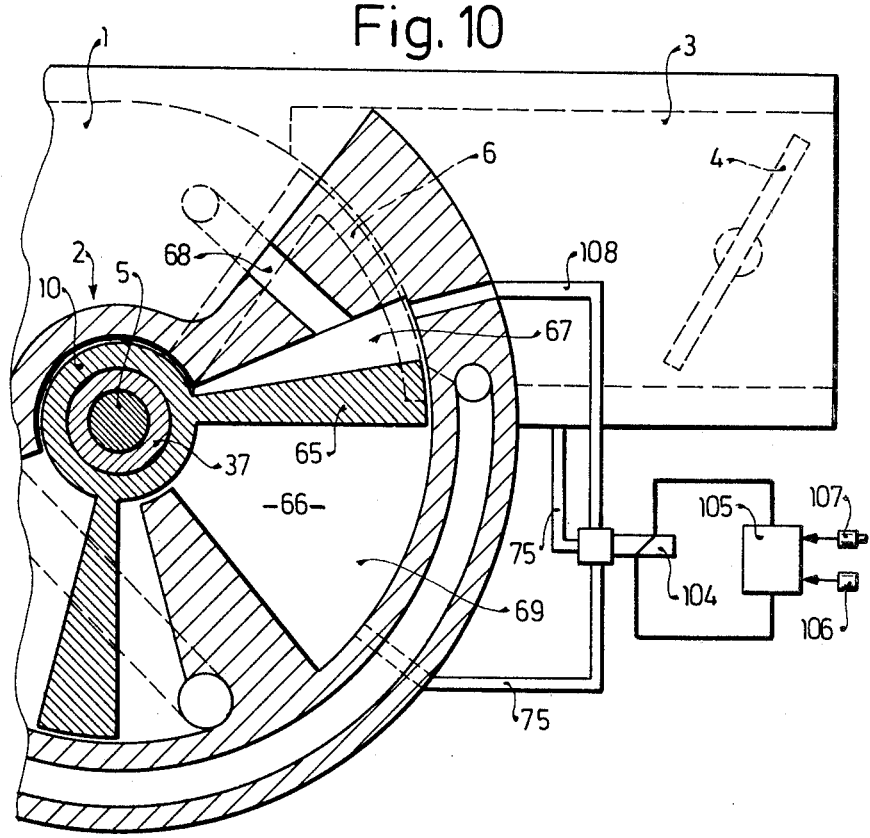
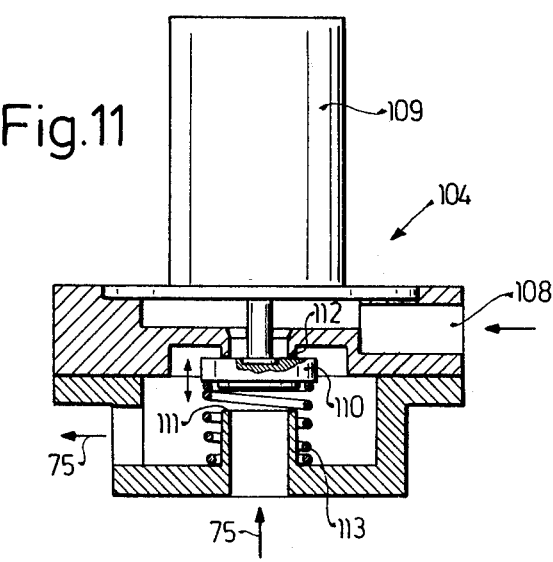

FUEL DELIVERY APPARATUS

BACKGROUND OF THE INVENTION

A fuel delivery apparatus is already known which has an air measuring element, but in which, as a result of the underpressure at the air measuring element caused by the flow constriction, a force operating counter to the opening force leads to a nonlinear air measurement characteristic curve; that is, there is a nonlinear ratio between the displacement of the air measuring element and the quantity of air flowing therethrough. Thus further corrections are required to accomplish a linearization. Furthermore, it is known to vary the fuel pressure in order to control the fuel-air mixture, so that a so-called high pressure fuel pump is required to deliver the fuel.

OBJECT AND SUMMARY OF THE INVENTION

The fuel delivery apparatus according to the invention has the advantage over the prior art that the air measuring element has a nearly linear characteristic curve and that the available adjustment forces of the air measuring element are independent of the induction tube section.

By means of the measures described in the dependent claims, further advantageous embodiments and improvements of the fuel delivery apparatus as noted above are possible. It is of particular advantage that the forces due to the air flow which act on the air measuring element are controlled in accordance with operating characteristics of the internal combustion engine in order to vary the fuel-air mixture without varying the fuel level, so that a low pressure fuel pump can be utilized.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 2 is a section along the lines II—II in FIG. 1;

FIG. 3 is a section along the lines III—III in FIG. 2;

FIG. 4 is a section along the lines IV—IV in FIG. 2;

FIG. 5 shows a cross-sectional view of a first exemplary embodiment of the control of the fuel delivery apparatus;

FIG. 8 shows a fourth exemplary embodiment of the control of the fuel delivery apparatus;

FIG. 9 shows a fifth exemplary embodiment of the control of the fuel delivery apparatus;

FIG. 10 shows a sixth exemplary embodiment of the control of the fuel delivery apparatus; and FIG. 11 shows an electromagnetic valve.

DESCRIPTION OF THE PREFERRED EMBODIMENTS

Figure 1:
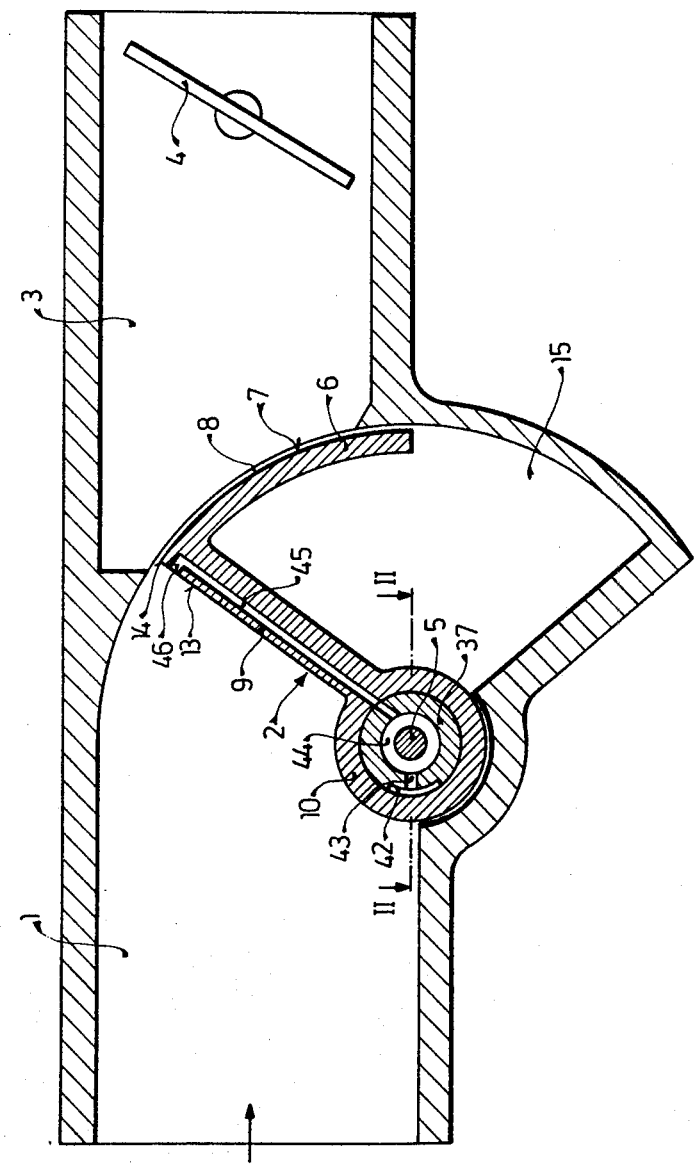
FIG. 1 is a cross-sectional view through a fuel delivery apparatus along the lines I—I of FIG. 2.

Turning now to FIG. 1, there will be seen a fuel delivery apparatus for a mixture-compressing, externally ignited internal combustion engine. The air required for combustion flows via an air filter, not shown, in the direction of the arrow into a region 1 of the air induction tube which includes the air measuring element 2 and then flows through a region 3 of the induction tube containing a freely settable throttle plate 4 and continues to one or more engine cylinders, not shown. The air measuring element 2 is mounted pivotably on a fixed shaft 5 and has a control body 6 in the form of a tubular segment transversely penetrating the air induction tube, the circular circumferential surface 7 of which control body 6 facing away from the shaft 5 overlies a free-flow aperture 8 which defines the flow-through area of the air induction tube downstream of the control body. The control body 6 is connected via a radially extending bridge 9 with a bearing hub 10 of the air measuring element 2, while the width of the bridge 9 is smaller than the induction tube diameter. The front wall 13 of the control body 6 which confronts the air flow controls the free-flow aperture 8, which defines the air induction tube cross-sectional area by means of its control edge 14 on the side away from the shaft 5 by opening the free-flow aperture 8 more or less widely in accordance with the quantity of air induced. The control body 6 penetrates the air induction tube section 1 with a narrow range of radial play. During an opening movement the control body 6 dips more or less deeply into a displacement space 15 of the air induction tube.

The displacement of the control body 6 is opposed by a spiral spring 16, best seen in FIG. 2, one end of which is attached to a bushing 37 coupled to the bearing hub 10 of the air measuring element 2 and the other end of which is connected to a stop 19, attached to the induction tube. If the basic adjustment of the bearing shaft 5 relative to the measuring element 2 must be changed for the purpose of fuel metering, to be described further below, there may be provided an adjustment lever 17 which is coupled to the bearing shaft 5 and which is moved relative to the stop 19 by an adjustment screw 18 (see FIG. 2).

To control the air measuring element in accordance with the quantity of air induced, the exemplary embodiment of the air measuring element 2 is thus provided with a radial vane 20 (FIG. 6), which is fixedly attached to the control body 6 by means of the bearing hub 10 and is pivotably arranged in coaxial relationship to the bearing shaft 5 within a work chamber 22 of a housing 23 provided on the induction tube outside the flow cross-sectional area. The radial vane 20 divides the space 22 into a first chamber 25 and a second chamber 26. The first chamber 25 communicates through a line 27 with the induction tube region 1 upstream of the control body 6, while the second chamber 26, into which the radial vane 20 swings during an opening movement of the control body 6, communicates through a line 28 with the induction tube region 3 downstream of the control body 6. Due to the pressure difference between the chambers 25 and 26, which is equal to the pressure difference across the free-flow opening 8, the radial vane 20 is subjected to a force which acts in the clockwise sense, i.e., in the opening direction of the control body 6 opposite the free-flow opening 8. As a result of the arrangement of the radial vane 20 at the air measuring element 2, the size of the radial vane 20 can be freely selected independently of the induction tube diameter, so that the greatest possible adjustment forces are generated.

As illustrated in FIG. 2, fuel is supplied by a fuel pump 30 driven by a motor 29 which pumps fuel from a container 31 through a line 32 into a first chamber 33 of a differential pressure valve 34. The fuel then continues to flow through the line 32 into a bore 35, shown dashed, within the bearing shaft 5 which communicates with a control groove 36 therein. Inserted by press-fit into the bearing hub 10 on which the air measuring element 2 is mounted is a bushing 37 which rotates snugly about the bearing shaft 5. The bushing 37 contains a control slot 38 which terminates in an annular groove 39. A control edge 40, best seen in FIG. 3, formed by the limiting surface of the control groove 36 on the bearing shaft 5 cooperates with the control slot 38 and defines a flow cross section therethrough of varying size, depending on the position of the control body 6. The control edge 40 and the control slot 38 together constitute a fuel metering valve 41 which is thus seen to be substantially confined to the vicinity of the bearing shaft 5 of the air measuring element 2. The metered fuel flows from the annular groove 39 through an annular groove 42 and an opening 43 within the bushing 37 into a further annular groove 44 on the bearing shaft 5. The annular groove 44 communicates with an injection conduit 45 within the bridge 9 and opens in the vicinity of the control edge 14 of the control body 6, preferably in the direction opposite to the air flow, into the induction tube. The single injection nozzle 46 could naturally be replaced by a plurality of nozzles or an injection slit.

The fuel is metered out by the fuel metering valve 41 under constant pressure difference. This constant pressure difference is maintained by a differential pressure valve 34 which includes a diaphragm 49 which separates a chamber 33 from a chamber 50 which receives the air pressure upstream of the control body 6 via an air line 51, shown dashed. The chamber 50 thus is held at the same pressure as prevails downstream of the control slot 38. A spring 52 biases the differential pressure valve 34 in the direction of closure. The pressure control valve 34 is embodied as a flat seat valve in which the diaphragm 49 is the movable valve member which cooperates with a fixed valve seat 57 through which fuel may return to the container 31 via a return line 58.

It has been found to be advantageous to admix air with the fuel prior to injection into the induction tube. The admixture of air is accomplished as illustrated in FIG. 4 by providing communication from the annular groove 44 through a groove 60 and a further annular groove 61 with an air hole 62 which terminates in the induction tube region 1 upstream of the control body 6. The admixture of air with the metered fuel prior to injection into the induction tube results in an improved mixture preparation and the transport of the metered fuel to the nozzle 46 is also improved.

In order to effect a damping of the adjustment movement of the air measuring element 2 during sudden induction tube pressure variations or a damping of the induction tube pressure swings produced by the induction strokes, there is likewise a damping vane 65 connected with the bearing hub 10 and pivotably fixed in a damping space 66 of the housing 23 coaxially to the bearing shaft 5. The damping vane 65 separates the damping chamber 66 into a pressure chamber 67, which communicates with the atmosphere or with the air induction tube section between the control body 6 and the air filter by means of a pressure line 68, and a throttle chamber 69, into which the damping vane 65 moves during an opening movement of the control body 6; the throttle chamber 69 is also connected with the pressure chamber 67 via the narrow gap 70 formed as a throttling point between the outer circumferential surface of the damping vane 65, which faces away from the bearing hub 10, and the wall of the damping chamber 66.

In FIG. 5, the control body 6 is shown in dashed lines, coaxially arranged in a plane located behind the housing 23, which is pivotable about the bearing shaft 5 and connected by means of the bearing hub 10 and the bushing 37 with the radial vane 20 and the damping vane 65. In order to be able to deliver a sufficiently rich fuel-air mixture to the internal combustion engine during idling, the throttle chamber 69 is connected according to the invention via a bore 72 with the second chamber 26 of the work chamber 22 in such a manner that, during an opening movement of the control body 6 which extends beyond the idling range, the opening 73 of the bore 72 swings out of the second chamber 26 and is covered by the housing wall, so that there is no further communication between the second chamber 26 and the throttle chamber 69.

According to the invention, the throttle chamber 69 of the damping chamber 66 likewise communicates with the air induction line section downstream from the throttle valve 4 via an underpressure line 75, or with the air induction tube section between control body 6 and throttle valve 4 via the underpressure line 75', while the cross-sectional area of the underpressure line 75, 75' is controlled by a control valve in accordance with operational characteristics of the internal combustion engine such as the temperature, the load status, the geodetic height or the composition of the exhaust gas. Thus, the temporary enrichment valve 75 switched into the underpressure line 75 and shown in FIG. 5 serves to accomplish a brief fuel enrichment when the throttle valve 4 suddenly opens. The temporary enrichment valve 76 is embodied as a differentiation box having a movable valve part in the form of a diaphragm 77, which can also have, as shown, a valve needle 78 for the control of the cross-sectional area of the underpressure line 75. The diaphragm 77 separates a chamber 79 which communicates with the underpressure line 75 from a chamber 80 which communicates with chamber 79 via a differentiation throttle point 81 and has a spring 82 which urges the temporary enrichment valve 76 in the closing direction. Between the temporary enrichment valve 76 and the induction tube there is a check valve 83 arranged in the underpressure line 75, 75', which opens in the direction of the induction tube and closes the underpressure line 75, 75' above a predetermined pressure level in the induction tube.

The temporary enrichment valve 76 operates as follows: During an acceleration, that is, when the throttle valve 4 suddenly opens, the induction tube pressure in the induction tube section 3, and thus the pressure in the chamber 79 via the opened check valve 83, rises, so that the diaphragm 77 is moved against the force of the spring 82 into the chamber 80 and the valve needle 78 moves with it, leaving the underpressure line cross-sectional area leading to the throttle chamber 69 open. By means of the pressure rise in the induction tube, the check valve 83 closes and air flows out of the throttle chamber 69, over the underpressure line 75, and into the chamber 79 of the temporary enrichment valve 76 until the pressure in the chamber 80 has risen, via the differentiation throttle point 81, which is preferably arranged in the diaphragm 77, to such a level that the valve needle 78 again closes the underpressure line 75 to the throttle chamber 69. A force is exerted briefly, by the flow of air out of the throttle chamber 69 of the damping chamber 66, onto the damping vane 65, and this force acts in the direction of a wider opening of the control body 6 and thus leads to an increase in the metered fuel quantity. By means of the design of the fuel delivery apparatus according to the invention, a supplementary opening force can be exerted on the damping vane 65, in order to enrich the fuel during an acceleration, which is in addition to the opening force of the air measuring element 2 exerted on the radial vane 20.

Figure 6:
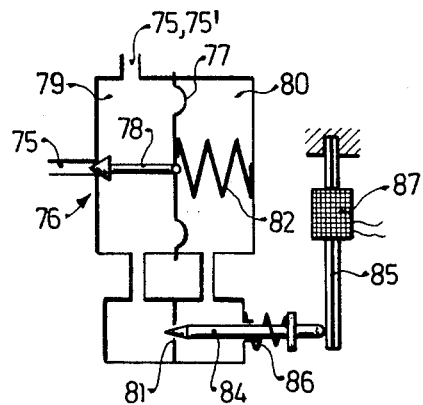
FIG. 6 shows a second exemplary embodiment of the control of the fuel delivery apparatus.

The temporary enrichment valve 76 shown in FIG. 6 differs from that of FIG. 5 solely in that the differentiation throttle point 81 between the chambers 79 and 80 is controllable in accordance with temperature by means of a valve needle 84. To accomplish this, a temperature-dependent element, such as a bimetallic spring 85, contacts the end of the valve needle 84 which points away from the differentiation throttle point 81 and moves the valve needle 84 against the force of a spring 86 in such a manner that at low operating temperatures of the internal combustion engine the cross-sectional area of the differentiation throttle point is very small, which produces a long differentiation period and thus a large enrichment quantity during acceleration, while when the engine is warmed up the differentiation throttle cross-sectional area is opened wider by the valve needle 84, which produces only a limited enrichment amount. An electric heating coil 87 can be arranged on the bimetallic spring 85, which is supplied with current after actuation of the starting and ignition switch of the internal combustion engine and thus heats the bimetallic spring 85 in a time-dependent manner. Thus, by this means the bimetallic spring 85 moves away from the valve needle 84, so that the differentiation throttle cross-sectional area is enlarged and the acceleration enrichment quantity is reduced.

Figure 7:
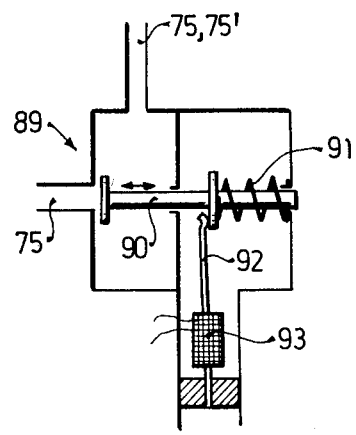
FIG. 7 shows a third exemplary embodiment of the control of the fuel delivery apparatus.

In order to enrich the fuel-air mixture during the warm-up phase of the internal combustion engine up to an operating temperature of approximately 80° C., there is a warm-up valve 89 arranged in the underpressure line 75, 75' in a further exemplary embodiment of the invention, shown in FIG. 7; the movable valve part 90 of this warm-up valve 89 opens the underpressure line 75 more or less widely during the warm-up phase of the internal combustion engine and closes the underpressure line 75 above the operating temperature of the engine. At temperatures below the operating temperature of the engine, the movable valve part 90 of the warm-up valve 89 is urged by means of a bimetallic spring 92 against the force of a closing spring 91 in the direction of an opening of the flow cross-sectional area of the underpressure line 75, while at temperatures above the operating temperature of the internal combustion engine the bimetallic spring 92 no longer contacts the movable part 90, so that the movable valve part 90, in response to the force of the closing spring 91, closes the cross-sectional area of the underpressure line 75. The bimetallic spring 92 is also capable of being heated in a time-dependent manner by means of a heating coil 93 switched on by the ignition and starting switch. By means of the control of the pressure in the throttle chamber 69 of the damping chamber 66 during the warm-up phase of the internal combustion engine via the warm-up valve 89, an additional opening force is exerted on the damping vane 65, so that a supplementary fuel quantity is metered at the fuel metering valve for the purpose of enrichment of the fuel during warm-up.

In the further exemplary embodiment shown in FIG. 8, there is warm-up valve 95 arranged in the underpressure line 75 between the induction tube section 3 downstream of the control body 6 and the throttle chamber 69; this warm-up valve 95 has a diaphragm 96 as its movable valve part, which separates a chamber 98 which communicates with the pressure chamber 67 via a line 97 from a chamber 99 which communicates with the throttle chamber 69 via the underpressure line 75, and the diaphragm 96 cooperates with a fixed valve seat 100 which defines the flow cross-sectional area of the underpressure line 75. Between the warm-up valve 95 and the induction tube section 3 there are a reservoir 101 and a check valve 102 in the underpressure line 75. In order to enlarge the flow cross-sectional area of the underpressure line 75 between the induction tube section 3 and the throttle chamber 69, a bimetallic spring 103 contacts the diaphragm 96, at temperatures below the operating temperature of the internal combustion engine; at higher temperatures it disengages so that the warm-up valve 95 closes. The bimetallic spring 103 is also capable of being heated by an electrical heating coil 93 after the engine is started by means of the starting and ignition switch in a time-dependent manner. As was already described in connection with the exemplary embodiment according to FIG. 7, a supplementary opening force is exerted on the damping vane 65 in the throttle chamber 69 by means of the underpressure in the induction tube section 3 via the warm-up valve 95, so that additional fuel is metered at the fuel metering apparatus 41. Since only a small underpressure prevails in the induction tube section 3 during acceleration in the upper partial-load range, close to the fuel-load range, so that during acceleration only a small opening force is exerted on the damping vane 65 and thus only a limited fuel enrichment quantity is produced, there is a reservoir 101 provided according to the invention downstream of the warm-up valve 95, into which, during acceleration in the full-load range after the check valve 102 has closed during the warm-up phase of the engine, air can still flow from the throttle chamber 69 over the valve seat 100, by which means a further brief enrichment of the fuel-air mixture is possible even in the full-load range when the throttle valve is opened.

In FIG. 9 a further exemplary embodiment of the fuel delivery apparatus according to the invention is shown, in which there is an electromagnetic valve 104 in the underpressure line 75 between the throttle chamber 69 and the induction tube section 3 downstream of the control body 6, which electromagnetic valve 104 is controlled via an electronic control device 105, or more specifically, the electromagnetic valve 104 is cycled in accordance with the electronic control device 105 via operating characteristics of the engine fed to transmitters. Such transmitters can be, for example, temperature sensor 106, attitude indicator for the throttle valve attitude or an oxygen sensor 107 measuring the oxygen partial pressure in the exhaust gas of the engine in order to regulate the fuel-air ratio to a set λ value. The influence of the pressure in the the throttle chamber 69 via the underpressure line 75 and the electromagnetic valve 104 leads as in the previous exemplary embodiments to a supplementary opening force on the air measuring element 2, by which means a supplemental fuel quantity is metered at the fuel metering valve 41. In this way, for example, an enrichment of the fuel-air mixture can be accomplished during the warm-up phase of the engine, at full-load or in accordance with the λ regulation.

The exemplary embodiment shown in FIG. 10 differs from that of FIG. 9 solely in that the electromagnetic valve 104 is embodied as a 2-way cycle valve, which connects the underpressure line 75 between induction tube section 3 and throttle chamber 69 additionally with an underpressure line 108 to the pressure chamber 67 of the damping chamber 66. The control of the electromagnetic valve 104 is accomplished, as in the exemplary embodiment of FIG. 9, by means of the electronic control device 105 in accordance with signals which are furnished by transmitters to the electronic control device. This arrangement permits, besides the generation of the supplementary opening force exerted on the damping vane 65 and thereby the control of a fuel enrichment, an engagement of the fuel delivery apparatus by means of which the fuel-air mixture is made leaner, for example to effect λ regulation, height correction, or medium-value error correction. The connection of the pressure chamber 67 via the underpressure line 108 and the 2-way cycle valve 104 with the underpressure line 75 leads to a reduction of the pressure in pressure chamber 67, so that the damping vane 65 and thus the air measuring element 2 are moved in a closing direction because of the pressure forces exerted on both sides of the damping vane 65, and this results in a simultaneous reduction of the metered fuel quantity at the fuel metering valve 41. Depending on the control of the 2-way cycle valve 104, then the alternating connection between first the pressure chamber 67 and then the throttle chamber 69 with the underpressure line leads to a supplementary opening and closing force respectively exerted on the damping vane 65, with the aid of which the attitude of the fuel metering valve 41 is influenced and thus the fuel-air mixture can be made richer or leaner.

FIG. 11 shows the design of the 2-way cycle valve 104, which has an electromagnet 109 which moves the movable valve part 110 between the valve seats 111 and 112. When there is no current in the electromagnet 109, the movable valve part 110 is pressed by a compression spring 113 against the valve seat 112 and thereby closes the underpressure line 108 leading to the pressure chamber 67. If the electromagnet is stimulated by the electronic control device 105, then it actuates the movable valve part 110 in such a way that it is seated on the valve seat 111 and thus closes the under-pressure line 75 to the throttle chamber 69, while the connection between the underpressure line 108 and the pressure chamber 67 is opened.

The invention relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel delivery apparatus for mixture-compressing, externally ignited internal combustion engines having an air induction tube and a fuel line, particularly those having a fuel injection point in the air induction tube, in which an air measuring element and an arbitrarily activatable throttle valve are arranged in seriatim and the air measuring element has a control body controlling the induction tube cross-sectional area, the attitude of which represents a standard for the induced air quantity and in accordance therewith the movable part of a valve positioned in the fuel line for the metering of a fuel quantity associated with the air quantity is adjusted, further characterized wherein a radial vane pivotably fixed in a work chamber and a damping vane pivotably fixed in a damping chamber are connected with said control body and the radial vane which separates the work chamber into plural chambers is acted upon on one side thereof by the upstream pressure and on the other side thereof by the downstream pressure of the control body in such a manner that a force contacts said radial vane which counters a return force and is capable of urging the control body in the direction of an enlargement of the controlled induction tube cross section; further wherein said damping vane separates said damping chamber into a pressure chamber and a throttle chamber, said pressure chamber being connected with atmospheric pressure.

2. A fuel delivery apparatus for mixture-compressing, externally ignited internal combustion engines having an air induction tube and a fuel line, particularly those having a fuel injection point in the air induction tube, in which an air measuring element and an arbitrarily activatable throttle valve are arranged in seriatim and the air mesuring element has a control body controlling the induction tube cross-sectional area, the attitude of which represents a standard for the induced air quantity and in accordance therewith the movable part of a valve positioned in the fuel line for the metering of a fuel quantity associated with the air quantity is adjusted, further characterized wherein a radial vane pivotably fixed in a work chamber and a damping vane pivotably fixed in a damping chamber are connected with said control body and the radial vane which separates the work chamber into plural chambers is acted upon on one side thereof by the upstream pressure and on the other side thereof by the downstream pressure of the control body in such a manner that a force contacts said radial vane which counters a return force and is capable of urging the control body in the direction of an enlargement of the controllable induction tube cross section; further wherein said damping vane separates said damping chamber into a pressure chamber and a throttle chamber, said pressure chamber being connected with atmospheric pressure and the throttle chamber, into which said damping vane moves during an opening movement of the control body, being connected with said pressure chamber via a throttle point.

3. A fuel delivery apparatus for mixture-compressing, externally ignited internal combustion engines having an air induction tube and a fuel line, particularly those having a fuel injection point in the air induction tube, in which an air measuring element and an arbitrarily activatable throttle valve are arranged in seriatim and the air measuring element has a control body controlling the induction tube cross-sectional area, the attitude of which represents a standard for the induced air quantity and in accordance therewith the movable part of a valve positioned in the fuel line for the metering of a fuel quantity associated with the air quantity is adjusted, further characterized wherein a radial vane pivotably fixed in a work chamber and a damping vane pivotably fixed in a damping chamber are connected with said control body and the radial vane which separates the work chamber into plural chambers is acted upon on one side thereof by the upstream pressure and on the other side thereof by the downstream pressure of the control body in such a manner that a force contacts said radial vane which counters a return force and is capable of urging the control body in the direction of an enlargement of the controlled induction tube cross section; further wherein said damping vane separates said damping chamber into a pressure chamber and a throttle chamber, said pressure chamber being connected with a pressure upstream of the control body and the throttle chamber, into which said damping vane moves during an opening movement of the control body, being connected with said pressure chamber via a throttle point.

4. A fuel delivery apparatus according to claim 2, further wherein said throttle chamber is arranged to be briefly connected with said induction tube section downstream of said control body, particularly downstream of the throttle valve via an underpressure line by means of a temporary enrichment valve during a sudden opening of the throttle valve.

5. A fuel delivery apparatus according to claim 4, characterized in that the temporary enrichment valve is embodied as a differentiation box, with a movable valve part embodied as a diaphragm for the control of the cross section of said underpressure line, while said diaphragm separates a first chamber which communicates with the underpressure line from a second chamber which communicates with said first chamber via a differentiation throttle point and has a spring arranged to urge said diaphragm in a direction to close said temporary enrichment valve.

6. A fuel delivery apparatus according to claim 5, further wherein said differentiation throttle point has a cross section which is controllable by means of a valve body which in turn is actuatable in a temperature-dependent manner.

7. A fuel delivery apparatus according to claim 6, further wherein a bimetallic spring serves to accomplish the temperature-dependent actuation of said valve body.

8. A fuel delivery apparatus according to claim 5, further wherein a check valve is arranged in said underpressure line between said temporary enrichment valve and said induction tube section, which closes the underpressure line above a predetermined pressure level.

9. A fuel delivery apparatus according to claim 2, further wherein said throttle chamber is associated with said induction tube section downstream of said control body via an underpressure line during the warm-up phase of the internal combustion engine by means of a warm-up valve which includes a movable valve member which is actuatable by means of a temperature-dependent member.

10. A fuel delivery apparatus according to claim 9, further wherein said warm-up valve further includes a reservoir and a check valve which are disposed in said underpressure line between said induction tube section and said throttle chamber.

11. A fuel delivery apparatus according to claim 2, further wherein said throttle chamber is associated with said induction tube section downstream of said control body via an under-pressure line by means of a control valve in accordance with operational characteristics of the internal combustion engine.

12. A fuel delivery apparatus according to claim 11, further wherein said control valve further includes an electromagnetic valve which is controlled by measurement value transmitters via an electronic control device.

13. A fuel delivery apparatus according to claim 2, further wherein said pressure chamber and said throttle chamber are arranged to be alternately connected via an underpressure line with said induction tube section downstream of said control body by means of an electromagnetic valve in accordance with operational characteristics of the internal combustion engine.

14. A fuel delivery apparatus according to claim 2, further wherein said throttle chamber of said damping chamber is arranged to be connected with one of said plural chambers of said work chamber via a bore, in which the pressure in said induction tube section downstream of the control body prevails, thereby to effect the enrichment of the fuel-air mixture during the idling phase of the internal combustion engine.

* * * * *